Patented Jan. 30, 1945

2,368,276

UNITED STATES PATENT OFFICE 2,368,276

PLANT DEFOLIATION

Robert E. Torley, Greenwich, Conn., assignor to American Cyanamid Company, New York, N. Y., a corporation of Maine No Drawing. Application December 13, 1943, Serial No. 514,187

4 Claims. (Cl. 47—58)

The present invention relates to the defoliation of growing plants.

The principal object of the invention is not only to defoliate plants where such action is desirable but to indirectly thereby increase the value of the crops from such plants, either through hastening maturity, improving the grade of the product or increasing the yield, or all of them.

Another important object of the invention is to control to a more or less degree the possible damage to the crop from plant diseases, predatory insects or the like, either by actually killing the disease, insect or other pest on the host plant, removing the same from the plant or by removing its source of food supply.

Still another important object of the invention is to defoliate living plants without actually killing the plant or damaging it to the extent that it will no longer perform its useful function in producing its fruit.

There are a number of compounds on the market sold for the purpose of killing plants which have a wide usefulness as weed killers. The action of these materials is to act as a poison to such an extent that the plant itself, including the roots, dies. This action is accompanied by a withering or drying of the plant leaves without, however, causing such leaves to be actually separated from the stem or stalk of the plant. The above action is generally to be avoided in carrying out the present invention.

Extensive observation of defoliant action indicates that the actual dropping of the leaves is the result of normal processes carried out by the plant to rid itself of injured leaf tissues. These processes go into operation whenever the leaves are sufficiently injured so that the functions are seriously impaired. When this condition is reached, the plant causes an abscission layer composed of meristematic cells to be grown across the base of the petiole. These cells lack cohesion and in effect produce a cut through the petiole, leaving only the vascular bundles intact. These are so weak, however, that the weight of the leaf or a slight breeze is sufficient to disengage the leaf. Therefore, artificial defoliation may be obtained by applying to the leaf a material which will injure it sufficiently to cause the formation of an abscission layer.

These investigations have determined, however, that if the injury to the leaf tissue is sufficiently extensive or if a sufficient quantity of the toxic material becomes translocated fast enough, that the plant is unable to produce an abscission layer, with the result that while the leaves wither and dry, they remain firmly attached to the stem and defoliation as such, does not result. It is important, therefore, that in the application of a defoliant, this effect be avoided as it is the purpose of this invention to rid the plant of leaves and not merely cause a withering and retention of the dry leaves on the plant.

A number of compounds, when applied to the leaves of growing plants, have been found to result in desirable defoliation. Regardless as to whether such defoliants are applied in dry form or liquid form, to be effective, the defoliant must act on the leaf cells in aqueous solution.

In some cases where the defoliant is applied as a dust, normal moisture condensation on the leaf in the form of dew is sufficient. However, extensive experimentation has clearly demonstrated that more efficient results are obtained if the defoliant is applied either in aqueous solution, thus providing its own moisture or any admixture with a hygroscopic agent, such as calcium chloride or magnesium chloride and with or without a wetting agent of which the sodium salt of isopropyl naphthalene sulfonic acid or sodium di-(2-ethylhexyl) sulfosuccinate are typical. Where the hygroscopic agent and/or wetting agent are used in admixture with a defoliant, the combination may be applied either as a dry dust with or without diluent or in aqueous solution or other dispersion.

The use of an aqueous solution or the use of dust containing a hygroscopic agent and/or wetting agent is particularly effective in arid regions where atmospheric moisture is deficient. Plants grown under arid conditions develop a toughness or resistance to defoliant poisons which makes the normal dosage of defoliant alone relatively ineffective. This deficiency, therefore, can be readily corrected and efficient results obtained by either supplying moisture in the form of aqueous solutions or the use of hygroscopic and/or wetting agents. The use of wetting agents materially assists in obtaining efficient contact between and spreading of the defoliant over the leaf surface.

Defoliation of plants at a certain stage in their life has many advantages.

In the case of cotton plants, defoliation at a certain stage in its life is highly desirable as not only does it expose the lower bolls, which in a luxuriant plant are made inaccessible to sunlight, for ripening purposes, but is also desirable from the standpoint of efficient picking whether by hand or by machine.

In hand picking of cotton, considerable time is lost in hunting for the open bolls because they are hidden in the foliage. If, therefore, the plant were defoliated, such bolls would be readily discernible and a more rapid picking could be accomplished.

In machine picking, the practice is to permit the plant to reach its optimum maturity and then to strip the plant of its open bolls on one pass. If there are dried leaves on the plant at this time, not only is the product littered with them, commonly termed in the trade "trash," but there is a tendency for the green leaves to be crushed with resultant staining of the cotton with chlorophyll. This abnormal color is impossible to remove and definitely lowers the grade of the cotton so picked.

Defoliation of cotton has other advantages than mentioned above, as for instance, in such case the boll weevil is deprived of its food supply, prior to its entering a state of hibernation. As a consequence, there is a definite lessening of the numbers of these pests which are able to live through the winter and emerge in a healthy state.

Another material advantage of defoliating cotton prior to its picking is that at this state the cotton aphid is particularly prolific. This is a sucking insect existing on the leaves, and the aphid excrement commonly termed "honey-dew" is a recognized source of graying or discoloration of the cotton itself, particularly noticeable following the use of calcium arsenate for boll weevil control. Therefore, by knocking the leaves off at this stage it removes the aphid from the environment of the open bolls and, therefore, prevents the undesirable discoloration.

Another important advantage in defoliation of plants is that insects and other pests to a large extent are located on the leaves. Obviously, therefore, if the leaves can be removed from the vicinity of the fruit of the plant, there is less tendency for the pests or diseases to attack the latter. Not only will the first generation of these pests or diseases be eliminated, but there is less opportunity for the formation of spores or larvae, as the case may be, for the production of a second generation for the next or following crops.

The guayule plant, which is coming more and more to the front as a source of rubber or rubber-like material, is normally harvested when the plants are from five to ten feet high. When it has reached this stage of development, there are very few leaves on the lower part of the stalk, which is fortunate because it is the woody part of the stalk and the roots which furnish the sap material from which the rubber is made. According to present methods, however, it is desirable to force this crop and, therefore, plants are harvested before they reach the normal height where there is a deficiency of leaves at the lower part of the plant. On the contrary, the entire stalk is covered with leaves at this stage. The guayule plant leaves are particularly succulent and contain large quantities of moisture. It is highly desirable, therefore, that these leaves be eliminated from the harvesting procedure as the presence of this moisture in the rubber extraction process introduces a real difficulty.

Application of defoliant to young guayule plants has the desirable effect, therefore, of knocking the leaves off so that the bare stalk and roots may then be suitably treated without introducing this difficulty.

In defoliation of citrus trees, particularly tangerines, and also peach trees, plum trees, apple trees, and the like, as well as cotton plants, it is sometimes desirable to remove a certain number of leaves to more or less force the maturity of the fruit, either through increased sunlight reaching the fruit or to direct the energy which would otherwise go to the leaves into the fruit itself. This result may be accomplished without difficulty by controlled application of defoliant.

String beans and soya beans may be effectively defoliated. This action is desirable, particularly as these plants normally produce a very lush and heavy foliage, which not only makes harvesting of the crop difficult, but as in the case of cotton, this foliage tends not only to harbor predatory insects but prevents sunlight from efficiently maturing maximum quantities of fruit.

It has also been found that if prior to complete maturity potato plants are defoliated, the nourishment normally going into the leaf at the last stage of the plant life is diverted into the tuber, which is a highly desirable action.

Among the most effective defoliants are certain compounds containing the cyanogen radical. Of such compounds, the defoliant action is effective where there is a highly electro-negative group adjacent to a cyanogen group. All such compounds are resonant. As it is known that the placing of a $CH_2$ group between two resonating groups will greatly reduce the resonance, it has been noted that while toxicity diminishes as resonance decreases, yet the toxicity value does not approach that of the loss in resonance of the molecule. These experiments clearly point to the necessity for the presence of a strong electro-negative group not far removed from the nitrile group.

Perhaps the outstanding material in the above category is calcium cyanamide. This may be obtained by furnacing calcium carbide in an atmosphere of nitrogen. In addition to large quantities of calcium cyanamide, this product also contains residual lime, carbide and some graphitic carbon and other minor impurities. The calcium cyanamide content of this product, therefore, is the principal contributor to the defoliant action as the other materials are innocuous and act merely as diluents.

Free cyanamide has been found to be particularly effective as a defoliant.

The other resonant compounds in which there is a strong electro-negative group not far removed from a nitrile group and, therefore, are effective defoliants, include glycinonitrile, beta-amino propionitrile, beta-amino propionitrile sulfate, glycolonitrile. On the other hands, acetonitrile was ineffective as a defoliant.

Other efficient defoliants are the thiocyanates and cyanates, whether the acid themselves or their water-soluble salts, such as those of the alkali metals or ammonium, cyanamide dihydrochloride, as well as the metallic cyanamides, such as those of the alkali metal and particularly the disodium.

As above indicated, however the most effective defoliants do not have a $CH_2$ group between resonating atoms or groups and there is a strong electro-negative element or group not far removed from the nitrile group.

Perhaps the most outstanding defoliants in the order of their effectiveness are free cyanamide, calcium cyanamide, cyanamide salts generally, thiocyanates and cyanates.

Other compounds not containing this cyanogen group which produce desirable defoliant action are the water-soluble fluorides, such as those of the alkali metals and particularly sodium, chlorates, hypochlorites and sulfamates, including the acids themselves as well as their water-soluble salts, such as those of the alkali metals and ammonium.

As above indicated, while these compounds produce defoliant action, when applied as dusts either with or without diluents, yet they are not only more efficient when applied as aqueous solutions or dispersions and with hygroscopic agents and/or wettings agents, but their effectiveness is more pronounced, uniform and positive with smaller quantities of the actual defoliant.

It has been found that the above defoliants have been effective for the purpose when used at the rate of from ten to one hundred and fifty pounds per acre. With the defoliant may be incorporated a hygroscopic agent to the extent of from 1 to 300% and/or a wetting agent from .001 to 15%.

The above mixtures may be applied as dry dusting powders with or without inert distenders such as talc and kieselguhr.

When applying in liquid form, the liquid may contain from 1% solids to saturation. These solids, including defoliant, hygroscopic and/or wetting agent, may vary in the above ratio, dependent on the plant to be defoliated, the moisture conditions surrounding the plant and the amount of liquid to be conveniently handled.

While the invention has been described with particular reference to specific embodiments, it is to be understood that it is not to be restricted thereto but is to be construed broadly and limited solely by the scope of the appended claims.

I claim:

1. A method of defoliating plants which includes the step of applying to the leaves a material of the formula

where X is chosen from the group consisting of hydrogen, alkali metal and ammonium, in a quantity sufficient to cause the leaves to drop off from the living plant.

2. A method of defoliating plants which includes the step of applying to the leaves an aqueous solution of a material having the formula

where X is chosen from the group consisting of hydrogen, alkali metal and ammonium, in a quantity sufficient to cause the leaves to drop off from the living plant.

3. A method of defoliating plants which includes the step of applying to the leaves a material of the formula

where X is an an alkali metal, in a quantity sufficient to cause the leaves to drop off from the living plant.

4. A method of defoliating plants which includes the step of applying to the leaves sulfamic acid in a quantity sufficient to cause the leaves to drop off from the living plant.

ROBERT E. TORLEY.